(12) United States Patent
Yamaya et al.

(10) Patent No.: US 7,351,477 B2
(45) Date of Patent: Apr. 1, 2008

(54) ANTIFOULING COATING COMPOSITIONS AND COATED ARTICLES

(75) Inventors: Masaaki Yamaya, Usui-gun (JP); Kazuharu Sato, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 250 days.

(21) Appl. No.: 11/098,663

(22) Filed: Apr. 5, 2005

(65) Prior Publication Data

US 2005/0227092 A1 Oct. 13, 2005

(30) Foreign Application Priority Data

Apr. 7, 2004 (JP) ............................. 2004-113382
Apr. 7, 2004 (JP) ............................. 2004-113407

(51) Int. Cl.
*B32B 9/04* (2006.01)

(52) U.S. Cl. .................. 428/447; 528/34; 106/287.16; 524/430; 524/431; 524/588; 525/100; 525/477

(58) Field of Classification Search ..................... None
See application file for complete search history.

(56) References Cited

U.S. PATENT DOCUMENTS

| | | | |
|---|---|---|---|
| 4,602,959 A | | 7/1986 | Kurita et al. |
| 4,889,770 A | * | 12/1989 | Ona et al. .................. 428/447 |
| 5,218,059 A | | 6/1993 | Kishihara et al. |
| 5,256,741 A | * | 10/1993 | Ogawa et al. .............. 525/477 |
| 6,180,249 B1 | | 1/2001 | Stein |

| | | |
|---|---|---|
| 2004/0006190 A1 | 1/2004 | Sakamoto et al. |

FOREIGN PATENT DOCUMENTS

| | | |
|---|---|---|
| EP | 0 564 275 A1 | 10/1993 |
| EP | 1 245 658 A1 | 10/2002 |
| JP | 8-12375 | 1/1996 |
| JP | 10-7438 | 1/1998 |
| JP | 11-152446 | 6/1999 |
| JP | 2000-129247 | 5/2000 |
| JP | 2000-143991 | 5/2000 |
| JP | 2000-351938 | 12/2000 |
| JP | 2001-139884 | 5/2001 |
| JP | 2001-205747 | 7/2001 |
| JP | 2002-53804 | 2/2002 |
| JP | 2003-206160 | 7/2003 |
| WO | WO 98/39391 | 9/1998 |

OTHER PUBLICATIONS

DATABASE WPI, AN 1998-095809, XP-002361154, JP 09-324142 A, Dec. 16, 1997.
DATABASE WPI, AN 1989-260879, XP-002361155, JP 01-190612 A, Jul. 31, 1989.

* cited by examiner

*Primary Examiner*—Marc S. Zimmer
(74) *Attorney, Agent, or Firm*—Oblon, Spivak, McClelland, Maier & Neustadt, P.C.

(57) ABSTRACT

An antifouling coating composition is provided comprising an organosilicon compound having a one end-blocked diorganopolysiloxane group and a condensation-curable silyl group in a common molecule, and optionally a heat-curable compound. The composition is applied and cured to a substrate to form a coat which has an improved surface protective function and durable water repellent and antifouling properties.

20 Claims, No Drawings

ANTIFOULING COATING COMPOSITIONS AND COATED ARTICLES

CROSS-REFERENCE TO RELATED APPLICATION

This non-provisional application claims priority under 35 U.S.C. §119(a) on Patent Application Nos. 2004-113382 and 2004-113407 filed in Japan on Apr. 7, 2004 and Apr. 7, 2004, respectively, the entire contents of which are hereby incorporated by reference.

TECHNICAL FIELD

This invention relates to antifouling coating compositions comprising an oligomeric or polymeric organosilicon compound having a linear diorganosiloxane chain attached at its one end within a molecule and having a hydrolyzable silyl or silanol group within the same molecule, or such an organosilicon compound and a heat-curable compound, the compositions being capable of forming antifouling coats having improved durability. It also relates to coated articles having cured coats of the coating compositions formed thereon.

BACKGROUND ART

From the past, a number of attempts have been made to form water- and oil-repellent coats on surfaces of substrates for imparting antifouling properties including stain-proof, decontamination, and anti-fingerprint properties.

One approach involves applying a coating composition having good stain-proof properties directly to a substrate surface and curing the coating to form an antifouling thin-film layer. There are many reports directed to fluorinated alkyl-substituted silanes or fluorinated polyether-substituted silanes, for example. Specifically, JP-A 10-7438 discloses fluorinated alkyl-substituted alkoxysilanes and silazanes; JP-A 2000-143991 discloses perfluoropolyether group-substituted silanes; JP-A 2000-351938 discloses acidic hydrolyzates of fluorinated alkyl-substituted alkoxysilanes and tetraalkoxysilanes; and JP-A 2002-53804 discloses hydrolytic condensates of two silanes, fluorinated silane and fluorine-free silane. These systems are advantageous in that they impart good water repellency and oil repellency and are durable, but have the economic disadvantage that the starting silane compounds are expensive. Another disadvantage is concern about safety because fluorine-containing silane compounds or cured products (coats) thereof will generate harmful HF when burned upon disposal.

When substrate surfaces are of flexible materials such as plastics, a protective film of hard material must be separately provided between the substrate and the antifouling coat. The basic need to provide two layers increases the expense of processing, resulting in an economic disadvantage.

From the economic standpoint, silicone-based antifouling coating compositions have been investigated. One exemplary system (see JP-A 2000-129247) utilizes a silane compound comprising three linear silicone units, to which a hydrolyzable silyl group with a very high hydrolysis potential such as Si—Cl or Si—NCO is attached via a spacer, and/or a partial hydrolyzate thereof. This system intends to fix a monomolecular layer to a glass surface, but has some drawbacks that the substrate to which the system is applicable is limited, and full fixation does not occur due to bulky hydrophobic groups. Further, the coat is less durable in that it is readily stripped when surface stains are removed with toluene and other good solvents to silicone. Additionally, when the system is applied to flexible substrates, it becomes necessary to provide two layers as previously discussed, resulting in increased expenses of processing, with an economic disadvantage.

Other exemplary systems include a system in which a dimethylsilicone having hydrolyzable silyl groups at both ends is dispersed in a silica matrix as disclosed in JP-A 2003-206160 and a laminate system comprising a substrate, a layer containing a fluorinated silane compound, and an overlying layer containing a linear silicone compound having hydrolyzable silyl groups, as disclosed in JP-A 2001-205747. In the former system, the dimethylsilicone having hydrolyzable silyl groups at both ends undergoes phase separation (becomes afloat to the top) due to lack of compatibility with the silica matrix, leading to crawling upon coat formation. Also, due to weak fixation, the coat can be readily removed upon washing with solvents such as toluene. In the latter system wherein the silicone compound is applied onto the fluorinated silane layer without hydrolysis, there arise problems of poor fixation and less durability and additionally, the treatment with the fluorinated silane can draw concern for safety.

For a protective coating composition to form a hard protective film, an attempt has also been made to add an oily component having a leveling ability for thereby imparting lubricity and decontamination to the cured film and improving the mar resistance. Exemplary is a system using a polyether-modified silicone oil as a lubricant as disclosed in JP-A 2001-139884. The system exhibits satisfactory lubricating and decontaminating abilities at the initial. However, since the oil component is not fixed within the film, it slowly bleeds out with the passage of time so that both the abilities gradually decline and eventually vanish. Coating agents having fluorinated alkyl groups incorporated therein are also under investigation. For example, JP-A 2000-351938 describes an acidic hydrolyzate of a fluorinated alkyl-substituted alkoxysilane and a tetraalkoxysilane; and JP-A 2002-53804 discloses hydrolytic condensates of two silanes, fluorinated silane and fluorine-free silane. These fluorinated treating agents impart good water repellency and are durable, but have the economic disadvantage that the starting silane compounds are expensive. If the fluorinated alkyl-substituted alkoxysilane is introduced in larger amounts in order to provide better water repellency, the cured film has a reduced crosslink density due to the non-crosslink ability of fluorinated alkyl groups so that the film becomes relatively flexible, lacking a part of surface protective function. When substrate surfaces are of flexible materials such as plastics, a protective film of hard material must be separately provided between the substrate and the cured film. The basic need to provide two layers increases the expense of processing, resulting in an economic disadvantage.

Also known is a silicone-based hardcoat composition to which a dimethylsilicone containing SiOH groups at both ends is added as a surface slip agent (see JP-A 11-152446). This system is found to have a function of hard protective coat. It often encounters crawling upon coating because the dimethylsilicone moiety contributing to lubricity lacks compatibility with the coating liquid. Also, the effect of the coating does not last because the dimethylsilicone is only weakly fixed within the coat due to low condensation reactivity.

JP-A 8-12375 proposes a process involving adding a hydrolyzate of a fluoroalkyl group-containing silane and a polydimethylsiloxane derivative to a hydrolyzate of tetraalkoxysilane and applying the resulting mixture immediately thereafter. The system uses a hydrolyzate of a hydrophobic fluoroalkyl group-containing silane and a hydrophobic polydimethylsiloxane derivative, which is less dispersible in the system. The system is said to undergo phase separation when coated, so that the relevant component migrates to the coating surface to exert favorable water repellency. However, when the system was actually applied, it was found to be practically unacceptable partly because of noticeable crawling and partly because the coating lacked durability in that the coating could be readily stripped by cleaning with fabric impregnated with toluene or similar solvents since the component lacked reactivity with the cured film base.

There exists a need for a coating composition with which a substrate can be surface treated in a single step to form a single coat having both a hard surface protective film function and an antifouling function.

SUMMARY OF THE INVENTION

An object of the invention is to provide an antifouling coating composition which can form an antifouling, water repellent coat having an improved surface protection function and durability while meeting the requirement of safety. Another object is to provide a coated article having a cured coat of the antifouling coating composition.

The inventors have discovered that when an antifouling coating composition comprising a novel organosilicon compound of formula (I) having a one end-blocked diorganopolysiloxane group, which is unknown in the art, and containing a condensation-curable silyl group in the same molecule, is applied to a surface of a substrate, a protective coat is formed which solves the above-discussed problems of the prior art in that the coat has improved water repellency and antifouling properties and is so durable that it cannot be stripped by washing with toluene or similar solvents.

It has also been discovered that when an antifouling coating composition comprising the organosilicon compound of formula (I) and a heat-curable compound such as thermosetting resin is applied alone to a surface of a substrate, the resulting coat, albeit a single layer, imparts water repellency and antifouling properties to the substrate surface together with a surface protective function and enough durability to prevent stripping upon washing with toluene or similar solvents. Particularly when a silicone resin is used as the heat-curable compound, the coat becomes a hard protective coat having good weatherability. When a disilane compound having a specific fluorine atom-containing spacer is used, the coat is endowed with an antireflective function as well.

In a first aspect, the present invention provides an antifouling coating composition comprising an organosilicon compound of the general compositional formula (I).

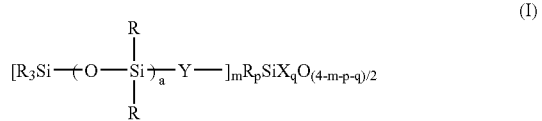

Herein R is a $C_1$-$C_6$ alkyl group or phenyl group, each R may be the same or different. X is a hydroxyl group, a halogen atom, a $C_1$-$C_6$ alkoxy, acyloxy or alkenoxy group, or a —NCO group. Y is —O—, or a $C_2$-$C_{10}$ alkylene or arylene group or a combination thereof. The subscript "a" is an integer of 1 to 100, m, p and q are numbers satisfying $0.01 \leq m<1$, $0 \leq p<1$, $0.5 \leq q<3$, and $0.51 \leq m+p+q<4$.

In a second aspect, the present invention provides an antifouling coating composition comprising (A) an organosilicon compound of the general compositional formula (I) and (B) a heat-curable compound in a weight ratio A/B of 0.01/100 to 50/100.

The preferred organosilicon compound of formula (I) is obtained through (partial) co-hydrolytic condensation of (a) an organosilicon compound of the general formula (II) and/or a (partial) hydrolyzate thereof and (b) an organosilicon compound of the general formula (III) and/or a (partial) hydrolyzate thereof in a molar ratio (a)/(b) of 1/99 to 99/1. More preferably, the organosilicon compound of formula (I) is prepared by a process including the steps of (i) hydrolyzing an organosilicon compound of the general formula (II), (ii) adding thereto an organosilicon compound of the general formula (III) and/or a (partial) hydrolyzate thereof, and (iii) effecting (partial) co-hydrolytic condensation of the resulting mixture.

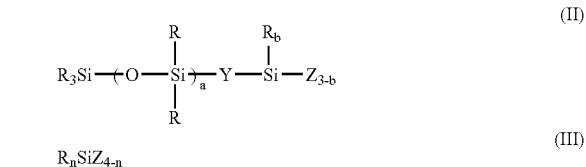

Herein R and "a" are as defined above, Z is a halogen atom, a $C_1$-$C_6$ alkoxy, acyloxy or alkenoxy group or a —NCO group, b is 0, 1 or 2, and n is 0, 1 or 2.

The antifouling coating composition may further comprise a condensation catalyst for silicone resins or an organic solvent or both.

Preferably, the heat-curable compound (B) comprises an organosilicon compound of the general formula (IV) and/or a (partial) hydrolytic condensate thereof.

Herein Z and n are as defined above, R' is a substituted or unsubstituted $C_1$-$C_6$ alkyl group or phenyl group, and R' may be the same or different when n is 2.

Also preferably, the heat-curable compound (B) comprises a disilane compound of the general formula (V) and/or a (partial) hydrolytic condensate thereof.

Herein R and Z are as defined above, A is a divalent fluorine-containing organic group, and c is 1, 2 or 3.

The coating composition may further comprising (C) fine particles selected from the group consisting of fine particles of a metal oxide containing a main component selected from among silicon oxide, titanium oxide, aluminum oxide, tin oxide, zirconium oxide, antimony oxide, indium oxide, cerium oxide and iron oxide, fine particles of compound oxides thereof, and microballoons thereof, in an amount of 0.1 to 100% by weight based on the total weight of components (A) and (B), and/or (D) a vinyl polymer containing alkoxysilyl groups, typically a vinyl polymer resulting from copolymerization of a vinyl monomer containing a UV-absorptive group, in an amount of 0.1 to 100% by weight based on the total weight of components (A) and (B).

In a further aspect, the invention provides a coated article comprising a substrate which is typically plastic, metal, glass or ceramic and a cured coat of the antifouling coating composition lying thereon directly or via another layer, the cured coat serving as an antifouling protective film. The other layer is typically a layer of a metal oxide or a resin containing Si—X groups wherein X is as defined above. It is preferred that the proportion of component (A) present at the outermost surface of the cured coat be higher than the proportion of component (A) present in a cured coat-forming component in the coating composition. The coated article is most often a transparent article for use as an optical part.

The invention of the first aspect has the following benefits. It is characterized in that the organosilicon compound of formula (I) as component (A) contains many condensation-curable groups at molecular ends. Then the antifouling coating composition of the invention firmly covers and effectively protects the substrate surface, achieving an excellent surface protective function.

The invention is also characterized in that the organosilicon compound of formula (I) also has a one end-blocked diorganopolysiloxane group in the same molecule so that the cured coat has the propensity that a moiety having a hydrolyzable group or SiOH group is secured to the substrate side and the diorganosiloxane moiety is oriented outward. Then the cured coat exhibits excellent water repellency and antifouling property (or decontamination). Since the coat is firmly fixed to the substrate, it is kept intact even after the wiping operation using toluene or similar solvents. Thus the coat is fully durable.

A third feature is the elimination of fluorine atoms. Fluorinated compounds generally exhibit excellent water repellency and oil repellency, but evolve harmful hydrogen fluoride when burned. This can be a problem upon disposal. The compounds used in the present invention release no such harmful substances and are safe.

The antifouling coating composition of the second aspect is arrived at by blending an organosilicon compound of formula (I) whose linear diorganopolysiloxane chain has a hydrolyzable silyl or silanol group substituted at one end with a heat-curable compound, especially a heat-curable silicone resin or a silicone resin containing divalent fluorinated organic groups in the backbone. The organosilicon compound of formula (I) has the unique structure that it contains a one end-blocked diorganopolysiloxane substituent group, which is less compatible with the heat-curable compound, and concurrently a condensable silyl group, which is fully compatible with the heat-curable compound or solvent, within the same molecule. Thus, in a solution stage, the organosilicon compound is uniformly dispersed in the solution of the heat-curable compound. If the solvent is evaporated off after coating, the organosilicon compound tends to turn incompatible and migrate to the surface.

As is well known in the art, conventional coating compositions comprising heat-curable compounds, especially heat-curable silicone resins form hard coatings and are thus effective as protective coatings on plastic, metal and ceramic substrates. However, when the heat-curable compounds are used alone, some coatings have short antifouling property and insufficient surface lubricity. When an organosilicon compound of formula (I) whose linear diorganopolysiloxane chain has been substituted at one end is blended with such a coating liquid, a cured, albeit single coat of the resulting composition is endowed on its surface with water repellency, antifouling property (decontamination), lubricity and anti-fingerprint property. The lubricity also contributes to improved mar resistance.

Then the antifouling coating composition of the second aspect has the following benefits.

(a) Efficient Working

A single coating step yields a single coat that includes two layers combined, a layer of heat-curable compound (B) serving a function of protective coat and a layer of organosilicon compound (A) serving a function of antifouling coat.

(b) Formation of Water Repellent, Antifouling Surface

After coating, the one end-blocked diorganosiloxane substituent having less compatibility is oriented outward so that the outermost surface is endowed with satisfactory water repellency and antifouling property (decontamination).

(c) Long-Lasting Antifouling Property

Since silyl groups contained in the same molecule are linked to the heat-curable compound by chemical bonds and hydrogen bonds, the protective layer of heat-curable compound (B) and the antifouling layer of organosilicon compound (A) are firmly and integrally combined. As a result, the coat withstands wiping with solvent-impregnated fabrics.

(d) Economic Advantage

Fluorinated compounds exhibit excellent water repellency and oil repellency, but are expensive. The compounds used in the invention are silicone resins which are economically advantageous over the fluorinated compounds, despite somewhat poor water repellency.

The antifouling coating compositions of the invention are advantageously applicable as protective coats and antireflective coats on various articles, for example, plastic glazing in automobiles and vehicles, protective films and plates on computer displays, TV screens, plasma displays, liquid crystal displays, mobile phones, digital cameras, and touch panels, optical parts such as instrument covers, and the like.

The antifouling coating compositions of the invention form antifouling coats having an improved surface protective function and durability and offer the benefits of safety and economy.

DESCRIPTION OF THE PREFERRED EMBODIMENTS

Organosilicon Compound (A)

In the first embodiment of the invention, the antifouling coating composition comprises an organosilicon compound of the general compositional formula (I), referred to as component (A), hereinafter.

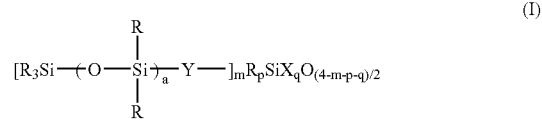

Herein R is an alkyl group having 1 to 6 carbon atoms or phenyl group, and each R may be the same or different. X is a hydroxyl group, a halogen atom, an alkoxy, acyloxy or alkenoxy group having 1 to 6 carbon atoms, or a —NCO group. Y is —O—, or an alkylene or arylene group having 2 to 10 carbon atoms or a combination thereof. The subscript "a" is an integer of 1 to 100, m, p and q are numbers satisfying $0.01 \leq m < 1$, $0 \leq p < 1$, $0.5 \leq q < 3$, and $0.51 \leq m+p+q < 4$.

Suitable examples of R include methyl, ethyl, propyl, butyl, hexyl, cyclohexyl, and phenyl. Methyl is most preferred for better antifouling property and an economic advantage.

Suitable examples of X include OH groups, halogen atoms such as Cl, alkoxy groups such as methoxy, ethoxy, propoxy, isopropoxy, butoxy and methoxyethoxy, alkenoxy groups such as isopropenoxy, acyloxy groups such as acetoxy, and —NCO (isocyanate) groups.

Y is a spacer group which links a one end-blocked diorganopolysiloxane group to an oligomeric organosilicon compound having a hydrolyzable group.

Suitable examples of Y include ethereal oxygen (indicative of a siloxane bond in this case), —(CH$_2$)$_2$—, —(CH$_2$)$_6$—, —(CH$_2$)$_8$—, —(CH$_2$)$_{10}$—, —(CH$_2$)$_2$—C$_6$H$_4$—(CH$_2$)$_2$—, —(CH$_2$)$_2$—C$_6$H$_{10}$—, etc. Of these, ethereal oxygen and —(CH$_2$)$_2$— are preferred for an economic advantage. Particularly when light resistance is required, ethereal oxygen is most preferred, indicating that all the base skeletons are formed of siloxane bonds.

The subscript m that represents a degree of substitution of one end-blocked diorganopolysiloxane groups should be in the range of $0.01 \leq m < 1$. With m less than 0.01, no satisfactory antifouling property is available. With m equal to or more than 1, curability is exacerbated. A range of $0.02 \leq m \leq 0.7$ is more preferred.

The subscript p that represents a degree of substitution of substituent R should be in the range of $0 \leq p < 1$. With p equal to or more than 1, the cured coat has a reduced crosslink density and hence, a reduced strength, leading to less durability. Also, when component (A) is used in combination with a heat-curable compound as component (B) to be described later, component (A) wherein p is equal to or more than 1 is less compatible with the heat-curable compound, causing crawling and insufficient fixation of the cured coat, which leads to a loss of durability. A range of $0 \leq p \leq 0.7$ is more preferred.

The subscript q that represents a degree of substitution of OH groups or hydrolyzable groups should be in the range of $0.5 \leq q < 3$. With q less than 0.5, the cured coat has a reduced crosslink density and hence, a reduced strength, leading to less durability. A q value equal to or more than 3 means an organosilicon compound monomer in a substantial sense, which prevents one end-blocked diorganopolysiloxane groups from being effectively oriented outward at the treated surface, failing to provide satisfactory antifouling property. A range of $1 \leq q \leq 2.5$ is more preferred.

The sum of m+p+q should be from 0.51 to less than 4, with a range of $0.6 \leq m+p+q \leq 3$ being preferred, and a range of $0.8 \leq m+p+q \leq 2.5$ being most preferred.

The subscript "a" that represents a degree of polymerization of diorganosiloxy (—O—SiR$_2$—) units should be in a range of 1 to 100. With "a" less than 1, the diorganosiloxane chain is too short to provide antifouling property. With "a" in excess of 100, no satisfactory antifouling property is achieved because effective orientation at the surface does not occur during the treatment, and the durability is low because surface fixation is not sufficient. The preferred range of "a" is from 1 to 50.

Any organosilicon compounds of formula (I) may be used herein as long as they satisfy the above requirements. Preferably they have a number average molecular weight (Mn) of 500 to 50,000, especially 1,000 to 20,000.

The organosilicon compound of formula (I) can be obtained through (partial) co-hydrolytic condensation of (a) an organosilicon compound of the general formula (II) and/or a (partial) hydrolyzate thereof and (b) an organosilicon compound of the general formula (III) and/or a (partial) hydrolyzate thereof in a molar ratio (a)/(b) of 1/99 to 99/1.

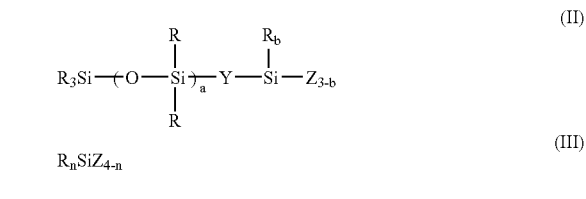

Herein R and "a" are as defined above, Z is a halogen atom, an alkoxy, acyloxy or alkenoxy group having 1 to 6 carbon atoms or a —NCO group, b is 0, 1 or 2, and n is 0, 1 or 2.

As used herein, the term "(partial) hydrolyzate" refers to partial hydrolyzates or complete hydrolyzates or mixtures thereof.

Z represents hydrolyzable groups, for example, halogen atoms such as Cl, alkoxy groups such as methoxy, ethoxy, propoxy, isopropoxy, butoxy and methoxyethoxy, alkenoxy groups such as isopropenoxy, acyloxy groups such as acetoxy, and —NCO (isocyanate) groups. Silane compounds having methoxy or ethoxy groups are preferred for ease of handling and easy control of hydrolytic reaction.

Illustrative, non-limiting examples of the organosilicon compound having formula (II) are given below.

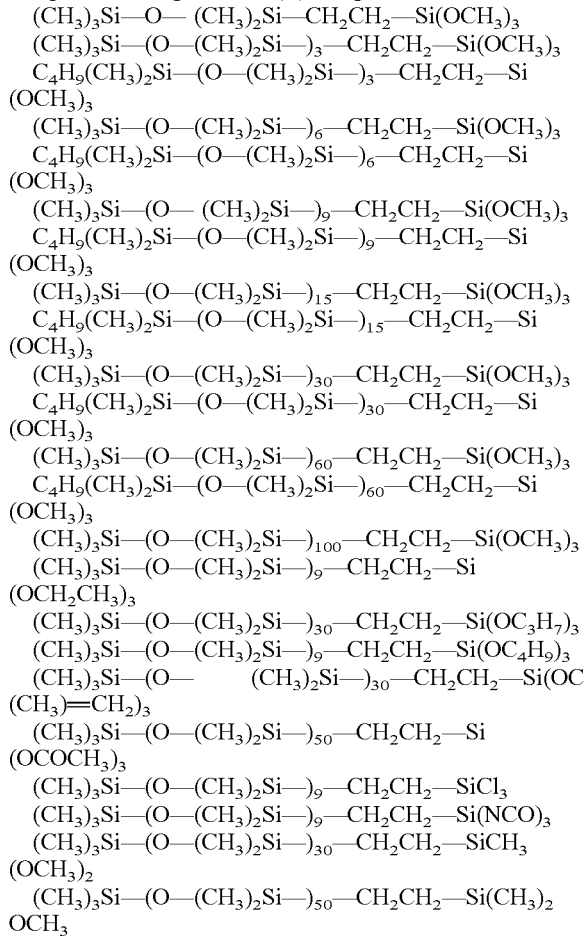

$(CH_3)_3Si—(O—(CH_3)_2Si—)_9—(CH_2)_2—C_6H_4—(CH_2)_2—Si(OCH_3)_3$
$(CH_3)_3Si—(O—(CH_3)_2Si—)_9—(CH_2)_2—C_6H_{10}—Si(OCH_3)_3$
$(CH_3)_3Si—(O—(CH_3)_2Si—)_{18}—(O—(C_6H_5)_2Si—)_2—CH_2CH_2—Si(OCH_3)_3$
$(CH_3)_3Si—O—(CH_3)_2Si—O—Si(OCH_3)_3$
$(CH_3)_3Si—(O—(CH_3)_2Si—)_3—O—Si(OCH_3)_3$
$C_4H_9(CH_3)_2Si—(O—(CH_3)_2Si—)_3—O—Si(OCH_3)_3$
$(CH_3)_3Si—(O—(CH_3)_2Si—)_6—O—Si(OCH_3)_3$
$C_4H_9(CH_3)_2Si—(O—(CH_3)_2Si—)_6—O—Si(OCH_3)_3$
$(CH_3)_3Si—(O—(CH_3)_2Si—)_9—O—Si(OCH_3)_3$
$C_4H_9(CH_3)_2Si—(O—(CH_3)_2Si—)_9—O—Si(OCH_3)_3$
$(CH_3)_3Si—(O—(CH_3)_2Si—)_{15}—O—Si(OCH_3)_3$
$C_4H_9(CH_3)_2Si—(O—(CH_3)_2Si—)_{15}—O—Si(OCH_3)_3$
$(CH_3)_3Si—(O—(CH_3)_2Si—)_{30}—O—Si(OCH_3)_3$
$C_4H_9(CH_3)_2Si—(O—(CH_3)_2Si—)_{30}—O—Si(OCH_3)_3$
$(CH_3)_3Si—(O—(CH_3)_2Si—)_{60}—O—Si(OCH_3)_3$
$C_4H_9(CH_3)_2Si—(O—(CH_3)_2Si—)_{60}—O—Si(OCH_3)_3$
$(CH_3)_3Si—(O—(CH_3)_2Si—)_{100}—O—Si(OCH_3)_3$
$C_4H_9(CH_3)_2Si—(O—(CH_3)_2Si—)_{100}—O—Si(OCH_3)_3$
$(CH_3)_3Si—(O—(CH_3)_2Si—)_9—O—Si(OCH_2CH_3)_3$
$(CH_3)_3Si—(O—(CH_3)_2Si—)_{30}—O—Si(OC_3H_7)_3$
$(CH_3)_3Si—(O—(CH_3)_2Si—)_{50}—O—Si(OC_4H_9)_3$
$(CH_3)_3Si—(O—(CH_3)_2Si—)_9—O—Si(OC(CH_3)=CH_2)_3$
$(CH_3)_3Si—(O—(CH_3)_2Si—)_{30}—O—Si(OCOCH_3)_3$
$(CH_3)_3Si—(O—(CH_3)_2Si—)_{50}—O—SiCl_3$
$(CH_3)_3Si—(O—(CH_3)_2Si—)_{50}—O—Si(NCO)_3$
$(CH_3)_3Si—(O—(CH_3)_2Si—)_9—O—SiCH_3(OCH_3)_2$
$(CH_3)_3Si—(O—(CH_3)_2Si—)_9—O—Si(CH_3)_2OCH_3$

The organosilicon compound having formula (II) can be synthesized by any conventional well-known methods as shown below.

(A) hydrosilylation reaction of a compound terminated with an unsaturated double bond, represented by the formula: $R_3Si—(O—R_2Si—)_{a-1}—R_2Si—Y'—CH=CH_2$ wherein Y' is a residue of Y with —CH=CH$_2$ eliminated, with a compound: $H—SiR_bZ_{3-b}$ in the presence of a hydrosilylating catalyst (B) hydrosilylation reaction of a compound terminated with an Si—H group, represented by the formula: $R_3Si—(O—R_2Si—)_{a-1}—R_2Si—H$ with a compound: $CH_2=CH—Y'—SiR_bZ_{3-b}$ in the presence of a hydrosilylating catalyst (C) condensation of a compound terminated with an Si—OH group, represented by the formula: $R_3Si—(O—R_2Si—)_{a-1}—R_2Si—OH$ with an excess of a compound: $SiR_bZ_{4-b}$, followed by removal under vacuum of the excess silane monomer Illustrative, non-limiting examples of the organosilicon compound having formula (III) include $SiCl_4$, $Si(OCH_3)_4$, $Si(OC_2H_5)_4$, $Si(OC_3H_7)_4$, $Si(OC_4H_9)_4$, $Si(OCOCH_3)_4$, $Si(NCO)_4$, $(C_4H_9O)_2$, $Si(OCOCH_3)_2$, $CH_3SiCl_3$, $CH_3Si(OCH_3)_3$, $CH_3Si(OC_2H_5)_3$, $CH_3Si(OC_3H_7)_3$, $CH_3Si(OC_4H_9)_3$, $CH_3Si(OCOCH_3)_3$, $CH_3Si(OC(CH_3)=CH_2)_3$, $CH_3Si(NCO)_3$, $C_6H_5Si(OCH_3)_3$, $C_6H_{11}Si(OCH_3)_3$, $C_6H_{13}Si(OCH_3)_3$, $(CH_3)_2SiCl_2$, $(CH_3)_2Si(OCH_3)_2$, $(CH_3)_2Si(OC_2H_5)_2$, $(CH_3)_2Si(OC_3H_7)_2$, $(CH_3)_2Si(OC_4H_9)_2$, $(CH_3)_2Si(OCOCH_3)_2$, $(CH_3)_2Si(NCO)_2$, $(C_6H_5)_2Si(OCH_3)_2$.

For hydrolysis, (a) the organosilicon compound of formula (II) and/or a (partial) hydrolyzate thereof and (b) the organosilicon compound of formula (III) and/or a (partial) hydrolyzate thereof are used in a molar ratio (a)/(b) in the range between 1/99 and 99/1. A ratio of less than 1/99 corresponds to a too low proportion of antifouling-contributing component (a), undesirably failing to exert an antifouling effect. A ratio of more than 99/1 undesirably leads to a reduced crosslink density and insufficient durability. The preferred range of (a)/(b) is between 2/98 and 70/30, and more preferably between 3/97 and 50/50.

In addition to the foregoing organosilicon compounds, additional compounds, typically silane coupling agents may be used in combination and subjected to (partial) co-hydrolysis for the purpose of improving the adhesion to substrates, insofar as they do not adversely affect the desired properties. Suitable silane coupling agents include
γ-glycidoxypropyltrimethoxysilane,
β-(3,4-epoxycyclohexyl)ethyltrimethoxysilane,
γ-glycidoxypropylmethyldimethoxysilane,
γ-aminopropyltriethoxysilane,
γ-methacryloxypropyltrimethoxysilane,
γ-acryloxypropyltrimethoxysilane, γ-mercaptopropyltrimethoxysilane, etc. An appropriate amount of the additional compound, if used, is 0.1 to 50 parts by weight per 100 parts by weight of the compound of formula (I).

For (partial) co-hydrolytic condensation of at least one of organosilicon compounds of formula (II) and (partial) hydrolyzates thereof and at least one of organosilicon compounds of formula (III) and (partial) hydrolyzates thereof, any conventional well-known methods may be employed as shown below.

First method: Two types of compounds are mixed and subjected to (partial) co-hydrolysis and optionally (partial) condensation.

Second method: An organosilicon compound of formula (II) is first hydrolyzed, after which an organosilicon compound of formula (III) and/or (partial) hydrolyzate thereof is added and subjected to (partial) co-hydrolysis and optionally (partial) condensation.

Third method: A hydrolyzate of an organosilicon compound of formula (II) and a hydrolyzate of an organosilicon compound of formula (III) are mixed, and optionally subjected to (partial) condensation.

Any of the foregoing methods may be employed. Since the organosilicon compound of formula (II) has a somewhat slow rate of hydrolysis, the second method involving previous hydrolysis of the organosilicon compound of formula (II) is advantageous in that two types of compounds are uniformly incorporated. Therefore, the preferred method for preparing the organosilicon compound of formula (I) involves the steps of (i) hydrolyzing an organosilicon compound of formula (II), (ii) adding thereto an organosilicon compound of formula (III) and/or a (partial) hydrolyzate thereof, and (iii) effecting (partial) co-hydrolytic condensation of the resulting mixture.

In effecting hydrolytic condensation, solvents may be used. Suitable solvents include alcohols such as methanol, ethanol, propyl alcohol, isopropyl alcohol, n-butyl alcohol, isobutyl alcohol, sec-butyl alcohol, t-butyl alcohol, and diacetone alcohol; glycol ethers such as ethylene glycol monomethyl ether, ethylene glycol monoethyl ether, propylene glycol monomethyl ether, and propylene glycol monoethyl ether; ketones such as acetone, methyl ethyl ketone, methyl isobutyl ketone, and acetylacetone; esters such as ethyl acetate, butyl acetate and ethyl acetoacetate; xylene, toluene, etc.

In effecting hydrolytic condensation, a variety of hydrolytic condensation catalysts well known in the art may be used. Suitable catalysts include, but are not limited to, acids such as hydrochloric acid, nitric acid, sulfuric acid, phosphoric acid, acetic acid, maleic acid and methanesulfonic acid; bases, for example, NaOH, ammonia, amine compounds such as triethylamine, dibutylamine, hexylamine, octylamine, dibutylamine, salts of such amine compounds, and quaternary ammonium salts such as benzyltriethylammonium chloride and tetramethylammonium hydroxide; fluorides such as potassium fluoride and sodium fluoride; solid acid catalysts or solid base catalysts (e.g., ion-exchange resin catalysts); metal salts of organocarboxylic acid such as iron 2-ethylhexoate, titanium naphthenate, zinc stearate and dibutyltin diacetate; organometallic compounds, for example, organic titanium esters such as tetrabutoxytitanium, tetraisopropoxytitanium, dibutoxy-(bis-2,4-pentanedionate)titanium, and diisopropoxy(bis-2,4-pentanedionate)titanium, organic zirconium esters such as tetrabutoxyzirconium, tetraisopropoxyzirconium, dibutoxy-(bis-2,4-pentanedionate)-zirconium, and diisopropoxy(bis-2,4-pentanedionate)zirconium, alkoxyaluminum compounds such as aluminum triisopropoxide, and aluminum chelate compounds such as aluminum acetylacetonate complex; and aminoalkyl-substituted alkoxysilanes such as γ-aminopropyltrimethoxysilane, γ-aminopropyltriethoxysilane, N-(β-aminoethyl)-γ-aminopropyltrimethoxysilane and N-(β-aminoethyl)-γ-aminopropyltriethoxysilane. They may be used alone or in admixture. The catalyst may find another use in such a way that it is blended in the antifouling coating composition just prior to coating, for the purpose of forming a densified tough coat after curing.

When the hydrolytic condensation catalyst is added in effecting hydrolytic condensation of organosilicon compounds of formulae (II) and (III), an appropriate amount of the catalyst is 0.001 to 10 parts by weight per 100 parts by weight of the reactants combined.

The conditions for hydrolytic condensation include a temperature ranging from room temperature (25°) to about 100° C. and a time ranging from 1 minute to about 10 days. Even when the third method of mixing two types of hydrolyzates is employed, the system becomes sufficiently uniform as long as it is previously held for a certain time. Specifically, while the system is kept at room temperature for an extended period of time, condensation proceeds at an appropriate rate so that the system becomes uniform.

In the second embodiment of the invention, the antifouling coating composition comprises (A) an organosilicon compound of formula (I) as defined above, and (B) a heat-curable compound.

Heat-Curable Compound (B)

Now the heat-curable compound as component (B) in the second embodiment is described. In the practice of the second embodiment, there may be used any heat-curable compounds including conventional well-known thermosetting resins. Examples include silicone resins, epoxy resins, acrylic resins, urethane resins, melamine resins, phenolic resins, fluoro-resins, polyamide resins, polyimide resins, and amino resins, as well as silicone-modified forms of the foregoing organic resins, also referred to as modified silicone resins, such as silicone-modified alkyd resins, epoxy resins, acrylic resins, polyester resins, polyimide resins and fluoro-resins. Since these heat-curable resins have least compatibility with one end-blocked dimethylsilicone chains, a mixture of components (A) and (B) behaves such that when the solvent in which both components (A) and (B) have been dissolved and dispersed is volatilized off, component (A) undergoes microscopic phase separation and thus migrates toward the outer surface as if the single coat were made of two layers, offering a satisfactory antifouling coat.

Particularly when the heat-curable compound or heat-curable resin used is a silicone-base agent (capable of forming a hard cured coat) comprising an organosilicon compound of the general formula (IV) below and/or a (partial) hydrolytic condensate thereof, the resulting coating composition can form a protective coat having improved weatherability and is thus advantageously applied to plastic substrates.

$$R'_n SiZ_{4-n} \quad (IV)$$

Herein Z and n are as defined above, R' is a substituted or unsubstituted alkyl group of 1 to 6 carbon atoms or phenyl group. R' may be the same or different when n is 2.

Suitable substituent groups include glycidoxy, epoxy, (meth)acryloxy, mercapto, ureido and amino groups.

Illustrative, non-limiting examples of the organosilicon compound of formula (IV) include SiCl$_4$, Si(OCH$_3$)$_4$, Si(OC$_2$H$_5$)$_4$, Si(OC$_3$H$_7$)$_4$, Si(OC$_4$H$_9$)$_4$, Si(OCOCH$_3$)$_4$, Si(NCO)$_4$, (C$_4$H$_9$O)$_2$Si(OCOCH$_3$)$_2$, CH$_3$SiCl$_3$, CH$_3$Si(OCH$_3$)$_3$, CH$_3$Si(OC$_2$H$_5$)$_3$, CH$_3$Si(OC$_3$H$_7$)$_3$, CH$_3$Si(OC$_4$H$_9$)$_3$, CH$_3$Si(OCOCH$_3$)$_3$, CH$_3$Si(OC(CH$_3$)=CH$_2$)$_3$, CH$_3$Si(NCO)$_3$, C$_6$H$_5$Si(OCH$_3$)$_3$, C$_6$H$_{11}$Si(OCH$_3$)$_3$, C$_6$H$_{13}$Si(OCH$_3$)$_3$, (CH$_3$)$_2$SiCl$_2$, (CH$_3$)$_2$Si(OCH$_3$)$_2$, (CH$_3$)$_2$Si(OC$_2$H$_5$)$_2$, (CH$_3$)$_2$Si(OC$_3$H$_7$)$_2$, (CH$_3$)$_2$Si(OC$_4$H$_9$)$_2$, (CH$_3$)$_2$Si(OCOCH$_3$)$_2$, (CH$_3$)$_2$Si(NCO)$_2$, (C$_6$H$_5$)$_2$Si(OCH$_3$)$_2$, γ-glycidoxypropyltrimethoxysilane,
γ-glycidoxypropylmethyldimethoxysilane,
γ-glycidoxypropyltriethoxysilane,
γ-glycidoxypropylmethyldiethoxysilane,
β-epoxycyclohexylethyltrimethoxysilane,
γ-methacryloxypropyltrimethoxysilane,
γ-methacryloxypropylmethyldimethoxysilane.
γ-acryloxypropyltrimethoxysilane,
mercaptopropyltrimethoxysilane,
γ-ureidopropyltrimethoxysilane, and
γ-aminopropyltriethoxysilane. The organic substituent group preferred to form a coat having better weatherability is methyl. Tri- and tetra-functional silanes are preferred when hard coats are desired. A difunctional silane may be used together when it is desired to impart flexibility to the coat. Also acceptable are (partial) hydrolytic condensates of these organosilicon compounds in any forms ranging from oligomers having condensed several monomeric units to polymers having a molecular weight of several ten thousands.

It is also preferred to use a disilane compound having a fluorinated spacer, represented by the general formula (V) below and/or a (partial) hydrolytic condensate thereof. The resulting cured coat has a lower refractive index at no expense of crosslink density and thus additionally imparts an antireflective function to optical articles. The use of disilane compound is more preferred when such a function is required.

$$Z_c R_{3-c} Si\text{-}A\text{-}SiR_{3-c} Z_c \quad (V)$$

Herein R and Z are as defined above, A is a divalent fluorine-containing organic group, and c is 1, 2 or 3.

A is a divalent organic group containing at least one fluorine atom. Any divalent organic groups may be used as long as they contain fluorine atoms. Exemplary structures are shown below.

—CH$_2$CH$_2$—(CF$_2$)$_d$—CH$_2$CH$_2$— [wherein d=2 to 20]
—CH$_2$CH$_2$—CF(CF$_3$) (CF$_2$)$_d$CF(CF$_3$)—CH$_2$CH$_2$—
—CH$_2$CH$_2$—CF(C$_2$F$_5$) (CF$_2$)$_d$CF(C$_2$F$_5$)—CH$_2$CH$_2$—
—CH$_2$CH$_2$—CF(CF$_3$)CF$_2$—O(CF$_2$)$_d$O—CF$_2$CF(CF$_3$)—CH$_2$CH$_2$—
—CH$_2$CH$_2$—C$_6$F$_{10}$—CH$_2$CH$_2$—
—CH$_2$CH$_2$—C$_6$F$_4$—CH$_2$CH$_2$—

Preference is given to —CH$_2$CH$_2$—(CF$_2$)$_d$—CH$_2$CH$_2$— and —CH$_2$CH$_2$—CF(CF$_3$)(CF$_2$)$_d$CF(CF$_3$)—CH$_2$CH$_2$—. Those of —CH$_2$CH$_2$—(CF$_2$)$_d$—CH$_2$CH$_2$— wherein n is 4 to 10 are more preferred because they offer hard, more antireflective coats. With less values of d, some coats may fail to meet any of the necessary functions of antireflection, antifouling, water repellency and chemical resistance. Too larger values of d may lead to a reduced crosslink density, failing to provide mar resistance.

Examples of the disilane compounds which meet these requirements are given below.

(CH$_3$O)$_3$Si—CH$_2$CH$_2$—(CF$_2$)$_4$—CH$_2$CH$_2$—Si(OCH$_3$)$_3$
(CH$_3$O)$_3$Si—CH$_2$CH$_2$—(CF$_2$)$_6$—CH$_2$CH$_2$—Si(OCH$_3$)$_3$
(CH$_3$O)$_3$Si—CH$_2$CH$_2$—(CF$_2$)$_8$—CH$_2$CH$_2$—Si(OCH$_3$)$_3$
(CH$_3$O)$_3$Si—CH$_2$CH$_2$—(CF$_2$)$_{10}$—CH$_2$CH$_2$—Si(OCH$_3$)$_3$
(CH$_3$O)$_3$Si—CH$_2$CH$_2$—(CF$_2$)$_{16}$—CH$_2$CH$_2$—Si(OCH$_3$)$_3$
(C$_2$H$_5$O)$_3$Si—CH$_2$CH$_2$—(CF$_2$)$_4$—CH$_2$CH$_2$—Si(OC$_2$H$_5$)$_3$
(C$_2$H$_5$O)$_3$Si—CH$_2$CH$_2$—(CF$_2$)$_6$—CH$_2$CH$_2$—Si(OC$_2$H$_5$)$_3$
(CH$_3$O)$_2$CH$_3$Si—CH$_2$CH$_2$—(CF$_2$)$_4$—CH$_2$CH$_2$—SiCH$_3$(OCH$_3$)$_2$
(CH$_3$O)$_2$CH$_3$Si—CH$_2$CH$_2$—(CF$_2$)$_6$—CH$_2$CH$_2$—SiCH$_3$(OCH$_3$)$_2$
(CH$_3$O)(CH$_3$)$_2$Si—CH$_2$CH$_2$—(CF$_2$)$_4$—CH$_2$CH$_2$—Si(CH$_3$)$_2$(OCH$_3$)
(CH$_3$O)(CH$_3$)$_2$Si—CH$_2$CH$_2$—(CF$_2$)$_6$—CH$_2$CH$_2$—Si(CH$_3$)$_2$(OCH$_3$)
(CH$_3$O)$_3$Si—CH$_2$CH$_2$—CF(CF$_3$)(CF$_2$)$_4$CF(CF$_3$)—CH$_2$CH$_2$—Si(OCH$_3$)$_3$
(CH$_3$O)$_3$Si—CH$_2$CH$_2$—CF(CF$_3$)(CF$_2$)$_6$CF(CF$_3$)—CH$_2$CH$_2$—Si(OCH$_3$)$_3$
(CH$_3$O)$_3$Si—CH$_2$CH$_2$—CF(CF$_3$)(CF$_2$)$_{12}$CF(CF$_3$)—CH$_2$CH$_2$—Si(OCH$_3$)$_3$
(CH$_3$O)$_3$Si—CH$_2$CH$_2$—C$_6$F$_{10}$—CH$_2$CH$_2$—Si(OCH$_3$)$_3$
(CH$_3$O)$_3$Si—CH$_2$CH$_2$—C$_6$F$_4$—CH$_2$CH$_2$—Si(OCH$_3$)$_3$

Of these, preference is given to the following disilane compounds:

(CH$_3$O)$_3$Si—CH$_2$CH$_2$—(CF$_2$)$_4$—CH$_2$CH$_2$—Si(OCH$_3$)$_3$,
(CH$_3$O)$_3$Si—CH$_2$CH$_2$—(CF$_2$)$_6$—CH$_2$CH$_2$—Si(OCH$_3$)$_3$,
(CH$_3$O)$_3$Si—CH$_2$CH$_2$—(CF$_2$)$_8$—CH$_2$CH$_2$—Si(OCH$_3$)$_3$,
(C$_2$H$_5$O)$_3$Si—CH$_2$CH$_2$—(CF$_2$)$_4$—CH$_2$CH$_2$—Si(OC$_2$H$_5$)$_3$,
(C$_2$H$_5$O)$_3$Si—CH$_2$CH$_2$—(CF$_2$)$_6$—CH$_2$CH$_2$—Si(OC$_2$H$_5$)$_3$.

When it is desired to impart good antireflection and a reduced refractive index to the cured coat, a silane compound of formula (IV) and/or a fluoroalkyl group-containing silane compound may be added to a disilane compound of formula (V) in a range not to affect the other properties, followed by co-hydrolysis. Examples of suitable fluoroalkyl group-containing silane compounds are given below.

CF$_3$CH$_2$CH$_2$—Si(OCH$_3$)$_3$
CF$_3$(CF$_2$)$_3$CH$_2$CH$_2$—Si(OCH$_3$)$_3$
CF$_3$(CF$_2$)$_7$CH$_2$CH$_2$—Si(OCH$_3$)$_3$
CF$_3$(CF$_2$)$_7$CH$_2$CH$_2$—Si(OC$_2$H$_5$)$_3$
CF$_3$(CF$_2$)$_7$CH$_2$CH$_2$—SiCH$_3$(OCH$_3$)$_2$
CF$_3$(CF$_2$)$_7$CONHCH$_2$CH$_2$CH$_2$—Si(OCH$_3$)$_3$
CF$_3$(CF$_2$)$_7$SO$_2$NHCH$_2$CH$_2$CH$_2$—Si(OC$_2$H$_5$)$_3$
C$_3$F$_7$O(CF(CF$_3$)CF$_2$O)$_3$CF(CF$_3$)$_7$OC$_3$H$_6$—Si(OCH$_3$)$_3$

In the antifouling coating composition of the second embodiment, the organosilicon compound (A) and the heat-curable compound (B) are mixed in a weight ratio A/B between 0.01/100 and 50/100. Outside the range, a lower ratio corresponding to a lower content of component (A) undesirably fails to provide antifouling property. A higher ratio corresponding to a higher content of antifouling component undesirably precludes the coat from exerting a protective function. The preferred weight ratio A/B is between 0.02/100 and 30/100.

Other Components

Other components may be compounded in the antifouling coating composition, whether it is the first or second embodiment. (C) Fine particles may be compounded which are selected from the group consisting of fine particles of a metal oxide selected from among silicon oxide, titanium oxide, aluminum oxide, tin oxide, zirconium oxide, antimony oxide, indium oxide, cerium oxide and iron oxide, fine particles of compound oxides thereof, and microballoons of metal oxides or compound oxides. These inorganic oxide fine particles are typically used in the form of a dispersion in a dispersing medium. The dispersing media used herein include water and organic solvents. When water is used as the dispersing medium for inorganic oxide fine particles, the pH of the dispersing medium is preferably adjusted to a range of 2 to 10, more preferably a range of 3 to 7. Examples of the organic solvents suitable as the dispersing medium for inorganic oxide fine particles include alcohols such as methanol, isopropyl alcohol, ethylene glycol, butanol and ethylene glycol monopropyl ether; ketones such as methyl ethyl ketone and methyl isobutyl ketone; aromatic hydrocarbons such as toluene and xylene; amides such as dimethylformamide, dimethylacetamide and N-methylpyrrolidone; esters such as ethyl acetate, butyl acetate and γ-butyrolactone; ethers such as tetrahydrofuran and 1,4-dioxane; β-diketones and β-ketoesters such as acetylacetone and ethyl acetoacetate. Of these, alcohols and ketones are preferred. The organic solvents may be used alone or in admixture as the dispersing medium. Use of colloidal silica and hollow silica sol is preferred when it is desired to impart antireflection to the cured coat while maintaining a low refractive index.

The preferred inorganic fine particles should have an average primary particle size of 0.001 to 0.1 μm and more preferably 0.001 to 0.05 μm. An average primary particle size in excess of 0.1 μm is likely to reduce the transparency of a cured coat formed from the resulting composition. Prior to use, the inorganic oxide fine particles may be surface treated with silane coupling agents or organometallic compounds such as titanium, aluminum or zirconium coupling agents. An appropriate amount of the fine particles, if compounded, is 0.1 to 100% by weight based on the total weight of components (A) and (B). Too smaller amounts of fine particles may fail to exert the intended properties whereas in too larger amounts, the cured coat may become too hard and likely to crack. The more preferred amount is 0.2 to 80% by weight.

In the antifouling coating composition, (D) a vinyl polymer containing alkoxysilyl groups may be compounded for the purposes of imparting adhesion and flexibility to and improving the weatherability of the coat. Examples of suitable vinyl polymers include copolymers of various vinyl polymerizable monomers, for example, (meth)acrylic acid derivatives such as methyl (meth)acrylate, butyl (meth)acrylate, 2-ethylhexyl (meth)acrylate, cyclohexylmethyl (meth)acrylate, glycidyl (meth)acrylate, and (meth)acrylic amide, and vinyl acetate, with alkoxysilanes having a (meth)acryloxy group or alkoxysilanes having a vinyl and/or styryl group. An appropriate amount of the vinyl polymer, if compounded, is 0.1 to 100% by weight based on the total weight of components (A) and (B).

Greater weatherability is expected when a vinyl monomer having a UV-absorptive group such as derived from hydroxybenzophenone, benzotriazole, cyanoacrylate or triazine is copolymerized with the above monomers. Suitable vinyl monomers having a UV-absorptive group include ethyl-2-cyano-3,3-diphenyl acrylate, 2-ethylhexyl-2-cyano-3,3-diphenyl acrylate, 2-(2-hydroxy-4-hexyloxyphenyl)-4,6-diphenyltriazine, 4-(2-acryloxyethoxy)-2-hydroxybenzophenone, and 2-(2'-hydroxy-5'-methacryloxyethylphenyl)-2H-benzotriazole.

In addition to the above-described components, the antifouling coating composition of the invention may further contain a condensation catalyst for silicone resins and an organic solvent. When the composition contains such components, the content of the organosilicon compound of formula (I) is preferably 0.001 to 33%, more preferably 0.01 to 20%, even more preferably 0.1 to 20%, and most preferably 0.1 to 5% based on the total weight of the composition. The condensation catalyst for silicone resins may be any of the catalysts exemplified above in conjunction with the hydrolytic condensation and is typically used in an amount of 0.001 to 10%, preferably 0.001 to 1%, more preferably 0.002 to 1%, even more preferably 0.01 to 1%, and most preferably 0.01 to 0.1% based on the total weight of the composition. The organic solvent may be any of the organic solvents exemplified above in conjunction with the hydrolytic condensation and is typically used in an amount of 0.1 to 99.99%, preferably 10 to 99%, more preferably 10 to 60% based on the total weight of the composition. In the first embodiment which does not contain component (B), the amount of the solvent may be typically 90 to 99.99 wt %, preferably 92 to 99 wt %.

Other optional components which may be present in the antifouling coating composition of the invention include organic and inorganic UV absorbers, leveling agents, and buffer agents for adjusting the system to a pH level of 2 to 7 where silanol groups are kept stable, such as acetic acid/sodium acetate and disodium hydrogen phosphate/citric acid.

The antifouling coating composition of the invention is applied and cured to a surface of a substrate, forming a cured coat which performs well as long as its thickness is equal to or more than the monomolecular layer. The thickness of the cured coat, which varies with the intended purpose, is generally in a range of 0.1 nm to 30 μm, preferably 0.5 nm to 10 μm, more preferably 1 nm to 10 μm. Even a thin film of 0.1 to 100 nm, and especially 0.5 to 30 nm is acceptable. The method of applying the composition to the substrate surface is not particularly limited, and any desired technique may be selected from conventional coating techniques including dipping, spin coating, flow coating, roll coating, spray coating, and screen printing. The dipping, spraying or roll coating technique is preferably selected for ease of film thickness control. On use, the composition may be diluted with any of the solvents that can be used in the aforementioned reactions. The composition is typically diluted to a concentration of 0.1 to 40% by weight, especially 0.1 to 10% by weight.

The conditions for curing coatings include a temperature ranging from room temperature to 300° C. and a time of at least 1 minute, especially 4 minutes to one week.

The transparent substrates to which the antifouling coating composition of the invention is applied include glass, ceramics, metals and plastics. Exemplary plastics include, but are not limited to, those having excellent optical properties, such as polycarbonate resins, polyalkylene terephthalate resins (typically PET), cellulose resins such as diacetyl cellulose, acetate butyrate cellulose and triacetyl cellulose, acrylic resins, polystyrene resins, polyimide resins, polyester resins, polyether sulfone resins, liquid crystal resins such as polyarylate, polyurethane resins, polyether ketone resins, polyolefin resins such as trimethylpentene and polyvinylnorbornene, high refractive index resins containing sulfur, and composite resins thereof. Preferred substrates are polycarbonate resins, polyalkylene terephthalate resins (typically PET), and triacetyl cellulose resins. The transparent substrates may take the form of molded shapes, plates, films or the like.

Before the antifouling coating composition of the invention is applied to the substrate surface, a layer of metal oxide or a layer of resin containing Si—X groups wherein X is as defined above may be laid on the substrate surface. The provision of such a layer onto the plastic substrate is preferable because good adhesion is achieved. Suitable metal oxides include $SiO_2$, $TiO_2$, $ZrO_2$, $InO_2$, $Al_2O_3$, ZnO, $CeO_2$, $SnO_2$, $HfO_2$ and $Sb_2O_5$. These metal oxides may be applied onto the substrate surface by vapor deposition such as CVD and evaporation, sputtering, or coating like the sol-gel method. Suitable resins containing Si—X groups are silicone-modified organic resins including acrylic resins, polyester resins, epoxy resins, and alkyd resins; acrylic resins having copolymerized a hydrolyzable silane compound having an unsaturated double bond; and organosilicon oligomers and silicone resins containing Si—X groups. The metal oxide layer or Si—X group-containing resin layer typically has a thickness of 0.01 to 10 μm, preferably 0.1 to 5 μm.

The transparent substrates coated with the antifouling coating compositions of the invention are advantageously utilized as optical parts.

EXAMPLE

Synthesis Examples and Examples of the invention are given below for illustrating the invention although the invention is not limited thereto. In Examples, all parts and percents are by weight. The average molecular weight is a number average molecular weight as measured by gel permeation chromatography (GPC) versus polystyrene standards.

Preparation Example 1

A 3-liter flask equipped with a stirrer, condenser and thermometer was charged with 175 g (0.20 mole) of an organosilicon compound of formula (i):

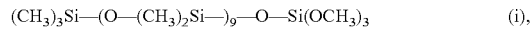

$(CH_3)_3Si\text{—}(O\text{—}(CH_3)_2Si\text{—})_9\text{—}O\text{—}Si(OCH_3)_3$       (i), 700 g of t-butanol, and 8 g of a solid acid catalyst, which were stirred and mixed at 25° C. To the flask, 36 g (2.0 moles) of deionized water was added dropwise over 10 minutes. The liquid was white turbid immediately after the addition. Moderate exothermic reaction took place and hydrolysis completed after 1 hour whereupon the liquid turned clear. To the liquid was added 832 g (4.0 moles) of tetraethoxysilane. The mixture was stirred at room temperature for one hour, after which 288 g (16.0 moles) of deionized water was added dropwise over 30 minutes. Moderate exothermic reaction took place so that the internal temperature reached 55° C. at the maximum. After the completion of dropwise addition, the liquid was stirred at room temperature for 24 hours. Then the solid acid catalyst was removed by filtration, yielding a coating liquid #1.

It was analyzed by GPC, finding a number average molecular weight of 9,730 and a single peak. On analysis by $^{29}$Si-NMR, the ratio of constituent units M/D/Q-1/Q-2/Q-3/Q-4 was determined to be approximately 4/36/7/18/21/14. This indicated that the liquid was a solution of a resin wherein m=0.07, a=9, p=0, and q=0.78, when expressed in terms of the parameters in formula (I). Note that R=CH$_3$, Y=O, and X=OH and OCH$_3$.

To determine the content of active component, the liquid was heated at 105° C. for 3 hours. The residue was 14.0%.

Preparation Example 2

A coating liquid #2 was prepared as in Preparation Example 1 aside from using instead of the compound (i), 488.4 g (0.20 mole) of an organosilicon compound of formula (ii).

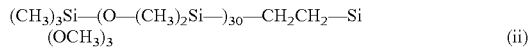

The liquid was analyzed by GPC, finding a number average molecular weight of 12,900 and a single peak. The liquid was a solution of a resin wherein m=0.06, a=30, p=0, and q=0.80, when expressed in terms of the parameters in formula (I). Note that R=CH$_3$, Y=CH$_2$CH$_2$, and X=OH, OCH$_3$ and OC$_2$H$_5$. The active component was 15.0%.

Preparation Example 3

A coating liquid #3 was prepared as in Preparation Example 1 aside from using 67.6 g (0.20 mole) of an organosilicon compound of formula (iii):

instead of the compound (i) and a mixture of 20.8 g (0.10 mole) of tetraethoxysilane and 13.6 g (0.1 mole) of methyltrimethoxysilane instead of 832 g (4.0 moles) of tetraethoxysilane.

The liquid was analyzed by GPC, finding a number average molecular weight of 3,450 and a single peak. The liquid was a solution of a resin wherein m=0.50, a=1, p=0.25, and q=0.76, when expressed in terms of the parameters in formula (I). Note that R=CH$_3$, Y=CH$_2$CH$_2$, and X=OH, OCH$_3$ and OC$_2$H$_5$. The active component was 7.1%.

Preparation Example 4

A 2-liter flask equipped with a stirrer, condenser and thermometer was charged with 175 g (0.20 mole) of the organosilicon compound (i) and 700 g of t-butanol, which were stirred and mixed at 25° C. To the flask, 36 g (2.0 moles) of 0.1N aqueous hydrochloric acid was added dropwise over 10 minutes. The liquid was white turbid immediately after the addition. Moderate exothermic reaction took place and hydrolysis completed after 1 hour whereupon the liquid turned clear. This is designated coating liquid #4-A.

Another 1-liter flask equipped with a stirrer, condenser and thermometer was charged with 832 g (4.0 moles) of tetraethoxysilane. To the flask, 288 g (16.0 moles) of 0.25N aqueous acetic acid was added dropwise over 30 minutes. Moderate exothermic reaction took place so that the internal temperature reached 55° C. at the maximum. After the completion of dropwise addition, the liquid was stirred at room temperature for 24 hours, yielding a coating liquid #4-B.

Both the liquids were thoroughly mixed and then held at room temperature for one week, yielding a coating liquid #4.

It was analyzed by GPC, finding a number average molecular weight of 8,120 and a single peak. The liquid was a solution of a resin wherein m=0.07, a=9, p=0, and q=0.78, when expressed in terms of the parameters in formula (I). Note that R=CH$_3$, Y=O, and X=OH, OCH$_3$ and OC$_2$H$_5$. The active component was 13.8%.

Preparation Example 5

A 2-liter flask equipped with a stirrer, condenser and thermometer was charged with 338 g (0.20 mole) of an organosilicon compound of formula (iv):

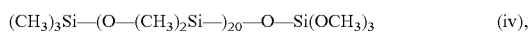

700 g of t-butanol, and 8 g of a solid acid catalyst, which were stirred and mixed at 25° C. To the flask, 10.8 g (0.6 mole) of deionized water was added dropwise over 5 minutes. The liquid was white turbid immediately after the addition. Moderate exothermic reaction took place and hydrolysis completed after 1 hour whereupon the liquid turned clear. To the liquid was added 166.4 g (0.8 mole) of tetraethoxysilane. The mixture was stirred at room temperature for one hour, after which 4.2 g (0.23 mole) of deionized water was added dropwise. After the completion of dropwise addition, the liquid was stirred at 60° C. for 6 hours. Then the solid acid catalyst was removed by filtration, yielding a coating liquid #5.

It was analyzed by GPC, finding a number average molecular weight of 2,750. The liquid was a solution of a resin whose molecule was terminated with an alkoxy group wherein m=0.20, a=20, p=0, and q=1.43, when expressed in terms of the parameters in formula (I). Note that R=CH$_3$, Y=O, and X=OH, OCH$_3$ and OC$_2$H$_5$. The active component was 36.5%.

Preparation Example 6

A coating liquid #6 was prepared as in Preparation Example 1 aside from using 488.4 g (0.20 mole) of the organosilicon compound of formula (ii) instead of the compound (i) and a mixture of 416 g (2.0 moles) of tetraethoxysilane and 236 g (1.0 mole) of γ-glycidoxypropyltrimethoxysilane instead of 832 g (4.0 moles) of tetraethoxysilane.

The liquid was analyzed by GPC, finding a number average molecular weight of 8,040 and a single peak. The liquid was a solution of a resin wherein m=0.06, a=30, p=0, and q=0.85, when expressed in terms of the parameters in formula (I). Note that R=CH$_3$, Y=CH$_2$CH$_2$, and X=OH, OCH$_3$ and OC$_2$H$_5$. The active component was 14.2%.

Comparative Preparation Example 1

A 3-liter flask equipped with a stirrer, condenser and thermometer was charged with 175 g (0.20 mole) of the organosilicon compound (i), 700 g of t-butanol, and 8 g of a solid acid catalyst, which were stirred and mixed at 25° C. To the flask, 36 g (2.0 moles) of deionized water was added dropwise over 10 minutes. The liquid was white turbid immediately after the addition. Moderate exothermic reaction took place and hydrolysis completed after 1 hour, but the liquid remained fairly opaque. The liquid was stirred at room temperature for 24 hours. Then the solid acid catalyst was removed by filtration, yielding a coating liquid #7.

It was analyzed by GPC, finding a number average molecular weight of 1,290 and a single peak. The liquid was a solution of a resin wherein m=1.00, a=9, p=0, and q=2.1, when expressed in terms of the parameters in formula (I). Note that R=CH$_3$, Y=O, and X=OH and OCH$_3$.

Comparative Preparation Example 2

A 0.5-liter flask equipped with a stirrer, condenser and thermometer was charged with 97.0 g of butyl acetate and 3.00 g (0.0030 mole) of a tribranched organosilicon compound of formula (v). The mixture was stirred and mixed at 25° C. for 24 hours, yielding a coating liquid #8.

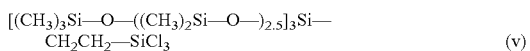
$$[(CH_3)_3Si—O—((CH_3)_2Si—O—)_{2.5}]_3Si—CH_2CH_2—SiCl_3 \quad (v)$$

Comparative Preparation Example 3

A 2-liter flask equipped with a stirrer, condenser and thermometer was charged with 312 g (1.5 moles) of tetraethoxysilane and 450 g of ethanol, which were stirred and mixed for 30 minutes. To the flask, a mixture of 216 g (12 moles) of 0.004N nitric acid in water and 20 g of ethanol was added. Stirring at room temperature for 15 hours yielded a silica sol liquid.

To the silica sol liquid was added a solution which was prepared by stirring and mixing 125 g of a 10% solution of 12.5 g (0.0032 mole) of an organosilicon compound of formula (vi) in ethyl acetate with 3,500 g of methyl ethyl ketone. Stirring at room temperature for 15 hours yielded a coating liquid #9.

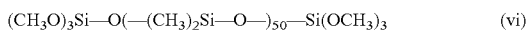
$$(CH_3O)_3Si—O(—(CH_3)_2Si—O—)_{50}—Si(OCH_3)_3 \quad (vi)$$

Comparative Preparation Example 4

A coating liquid (10) was prepared as in Comparative Preparation Example 3 aside from using 12.4 g (0.0032 mole) of an organosilicon compound of formula (vii) instead of the compound (vi).

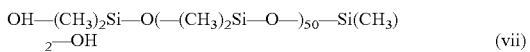
$$OH—(CH_3)_2Si—O(—(CH_3)_2Si—O—)_{50}—Si(CH_3)_2—OH \quad (vii)$$

Synthesis Example 1

A 1-liter flask equipped with a stirrer, condenser and thermometer was charged with 178 g (1.00 mole) of methyltriethoxysilane, 140 g of isobutanol, and 2 g of 10% acetic acid in water, which were stirred and mixed at 25° C. The flask was cooled to 5° C., after which 150 g of an aqueous acidic colloidal silica solution (active component 20%) was added. After the addition, the flask was brought back to 25° C. The liquid was stirred at 25° C. for 48 hours, whereupon it turned into a clear solution. To the solution were added 60 g of propylene glycol monomethyl ether and 0.2 g of a 10% sodium acetate solution. The mixture was thoroughly stirred and filtered, yielding a silicone hardcoat liquid (A).

Synthesis Example 2

A 3-liter flask equipped with a stirrer, condenser and thermometer was charged with 236 g (1.00 mole) of γ-glycidoxypropyltrimethoxysilane, 44 g (0.20 mole) of γ-glycidoxypropylmethyldimethoxysilane, 450 g of isobutanol, and 1 g of an ion-exchange resin, which were stirred and mixed at 25° C. To the flask was added 180 g (10 moles) of deionized water. The mixture was stirred at 25° C. for 5 hours, after which 1,200 g of a methanol solution in sol form of titanium oxide surface coated with silica (active component 25%) was added. After the completion of addition, the liquid was stirred at 25° C. for 48 hours, yielding a clear solution. To the solution was added 2 g of aluminum acetoacetonate. The mixture was thoroughly stirred and filtered, yielding a silicone hardcoat liquid (B) for high refractive index use.

Synthesis Example 3

A 0.5-liter flask equipped with a stirrer, condenser and thermometer was charged with 29.1 g (0.05 mole) of a disilane compound of the formula:

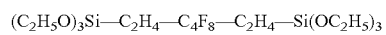
$$(C_2H_5O)_3Si—C_2H_4—C_4F_8—C_2H_4—Si(OC_2H_5)_3$$

and 125 g of ethanol, which were stirred at 25° C. With stirring, 1 g of an ion-exchange resin was added, and 10 g of water was added dropwise over 10 minutes. The mixture was stirred at 25° C. for a further 20 hours to drive hydrolysis to completion. The ion-exchange resin was filtered off, after which 2 g of aluminum acetylacetonate as a condensation catalyst was added. The mixture was stirred for 30 minutes and filtered, yielding a silicone hardcoat liquid (C) for low refractive index use.

Synthesis Example 4

A 1-liter flask equipped with a stirrer, condenser and thermometer was charged with 330 g of a 2:1 solvent mixture of diacetone alcohol and methyl isobutyl ketone and heated at 80° C. In a nitrogen atmosphere, a mixture of 24.8 g of γ-methacryloxypropyltrimethoxysilane, 170 g of methyl methacrylate, 14.2 g of glycidyl methacrylate, 10 g of 2-(2'-hydroxy-5'-methacryloxyethylphenyl)-2H-benzotriazole, and 2 g of azobisisobutyronitrile was added dropwise over 30 minutes to the solvent mixture being heated and stirred. The mixture was heated and stirred at 80° C. for 5 hours, yielding a solution of an acrylic polymer having a number average molecular weight of 116,000 and containing hydrolyzable silyl groups and UV-absorptive groups.

Separately, 60 g of 0.1N acetic acid in water was added dropwise over 30 minutes to a solution of 136 g (1.00 mole) of methyltrimethoxysilane in 72 g of isopropanol at room temperature. After the completion of dropwise addition, this solution was combined with 200 g of the acrylic polymer solution prepared above and 0.1 g of sodium formate and 10 g of acetic acid as condensation catalysts. The mixture was stirred and mixed, yielding a silicone hardcoat liquid (D).

Example 1

To 100 g of the coating liquid #1, 0.5 g of aluminum acetylacetonate was added as a curing catalyst and 4,900 g of ethanol added for dilution. The mixture was thoroughly stirred and mixed into a treating liquid #1. A glass plate whose surface had been washed clean was coated with the treating liquid #1 by immersing it in the liquid and pulling up at a speed of 250 mm/min. The coated glass plate was air dried for 10 minutes and heat cured at 80° C. for 60 minutes, forming a cured coat on the glass substrate.

The cured coat was marked with black oily marker ink and then wiped with tissue paper. The ink marks were wiped off to give a clean surface, indicating easy removal of any contaminants. Next, the coat surface was repeatedly rubbed with toluene-impregnated absorbent cotton over 10 back-and-forth strokes. With the cotton replaced by fresh toluene-impregnated absorbent cotton, the same operation was repeated to a total of 3. Thereafter, the black marker ink test was carried out again. The ink marks were wiped off to give a clean surface, indicating that the coat was durably anti-fouling.

The cured coat was measured for a contact angle with water. It had a contact angle of 103°, indicating good water repellency. The coat was subjected to a rubbing test with toluene-impregnated absorbent cotton as described above, after which it was measured for a contact angle with water again. A contact angle of 103° was found, that is, the coat was kept unchanged. Also, the coat was subjected to an abrasion test by means of a reciprocal scratch tester (KNT Co., Ltd.) by moving a flannel-covered indenter under a load of 1.2 kgf/cm² and over 500 cycles, after which it was measured for a contact angle with water again. The same contact angle of 103° was found. It was demonstrated that the cured coat was durably water repellent.

Examples 2-5 and Comparative Examples 1-3

Cured coats were formed and tested as in Example 1, aside from using the coating liquids #2 to #6 instead of the coating liquid #1 according to the formulation shown below. The coating liquids #7 and #8 were coated without dilution. The results are shown in Table 1.

It is noted in Table 1 that Al in the "Curing catalyst" row is aluminum acetylacetonate and P is phosphoric acid anhydride. Their addition amounts are equal.

In the rating of "Marker ink test," symbol "○" indicates easy wiping-off of marker ink, and "X" indicates that marker ink was not fully wiped off, leaving some marks.

TABLE 1

| | | Example | | | | | Comparative Example | | |
|---|---|---|---|---|---|---|---|---|---|
| | | #1 | #2 | #3 | #4 | #5 | #1 | #2 | #3 |
| Coating liquid | | 1 | 2 | 3 | 4 | 5 | 7 | 8 | 9 |
| Curing catalyst | | A1 | A1 | A1 | A1 | P | A1 | — | — |
| Marker ink test | Initial | ○ | ○ | ○ | ○ | ○ | ○ | ○ | ○ |
| | After toluene rub | ○ | ○ | ○ | ○ | ○ | X | X | X |
| Contact angle with water (°) | Initial | 103 | 105 | 102 | 102 | 103 | 104 | 103 | 103 |
| | After toluene rub | 103 | 105 | 101 | 102 | 103 | 30 | 10 | 10 |
| | After abrasion test | 103 | 104 | 101 | 102 | 103 | 10 | 0 | 10 |

Example 6

Onto a polycarbonate plate, an acrylic resin primer PC-7A (trade name, Shin-Etsu Chemical Co., Ltd.) was coated and cured to form a cured film of 3 μm thick. Onto the primer film, a coating liquid which was freshly prepared by formulating and diluting the coating liquid #1 as in Example 1 was coated and cured as in Example 1. The same tests as in Example 1 were carried out, with the results shown in Table 2.

TABLE 2

| | | Example 6 |
|---|---|---|
| Substrate | | PC |
| Primer PC-7A | | applied |
| Coating liquid | | #1 |
| Curing catalyst | | A1 |
| Marker ink test | Initial | ○ |
| | After toluene rub | ○ |
| Contact angle with water (°) | Initial | 103 |
| | After toluene rub | 103 |
| | After abrasion test | 103 |

Examples 7-11 and Comparative Example 4

Coating liquids were prepared by blending the hardcoat liquid (A) with the inventive coating liquid #1 (both prepared above) according to the formulation shown in Table 3. They were applied and cured to various substrates. The coated articles were tested. The results are shown in Table 3.

Coating Procedure

The transparent resin substrates used were plates of polycarbonate (PC) and acrylic resin dimensioned 10 cm by 10 cm by 0.5 mm (thick). The film used was a film of polyethylene terephthalate (PET) dimensioned 10 cm by 10 cm by 50 μm (thick). After the resin plates and the film were cleaned on their surface, the coating liquid was applied to a predetermined coating thickness by means of a bar coater or by dipping.

When the coating liquid was coated alone, the cured coat had a thickness of 2 to 3 μm. When a multilayer structure was desired for antireflection purposes, the high refractive index layer was coated to a thickness of 0.1 μm, and the low refractive index layer coated to a thickness of 0.1 μm.

The outer appearance of the coat was visually observed and rated. Symbol "○" indicates a satisfactory appearance.

Curing Conditions

The coating liquid was applied to the substrate, air dried for 30 minutes for volatilizing off the solvent, and held in a hot air circulating oven at 80 to 120° C. for 60 minutes for curing the coat.

Mar Resistance Test

Test 1

The cured coat was subjected to a marring test by means of a reciprocal scratch tester (KNT Co., Ltd.) by moving a steel wool #0000-covered tool under a load of 100 g/cm$^2$ and over 10 cycles, after which the number of flaws was counted. The coat was rated according to the following criterion.

| Rating | Number of flaws |
|--------|-----------------|
| ⊚ | 0 |
| ○ | 1-2 |
| Δ | 3-5 |
| X | ≧6 |

Test 2

The cured coat was subjected to a marring test by means of the same tester by moving a flannel-covered tool under a load of 1 kg/cm$^2$ and over 1,000 cycles, after which the number of flaws was counted. The coat was rated according to the following criterion.

| Rating | State |
|--------|-------|
| ○ | no flaw |
| Δ | haze |
| X | stripped |

Antireflection

Using an optical thin film meter, the coat was measured for a reflectance at wavelength 550 nm.

Antifouling

The cured coat was marked with black oily marker ink and then wiped with tissue paper to examine whether any contaminants could be readily removed. The coat was rated good (○) for easy removal and poor (X) when marks were left. Next, the coat surface was repeatedly rubbed with toluene-impregnated absorbent cotton over 10 back-and-forth strokes. With the cotton replaced by fresh toluene-impregnated absorbent cotton, the same operation was repeated to a total of 3. Thereafter, the black marker ink test was carried out again to examine whether the coat retained an ability to help wipe off ink marks. The coat was rated good (○) when it was durably antifouling and poor (X) when the decontamination ability had vanished.

In the case of PC and PET substrates, an acrylic resin primer PC-7A (trade name, Shin-Etsu Chemical Co., Ltd.) was coated before the coating operation of these examples was carried out.

The coating liquid (A+#1) of Example 7 was cured on a Teflon® film, obtaining a free cured film. The bottom surface (substrate side) and top surface of the film were analyzed by X-ray photoelectron spectroscopy (XPS) to determine the ratio of carbon to silicon atoms present on both the surfaces.

Substrate side surface: C/Si=0.7

Top surface: C/Si=1.3

It is evident that the coating composition of the invention is present richer on the top surface side.

It has been demonstrated that a blend of a silicone compound (I) having a one end-blocked diorganopolysiloxane group and a condensation-curable silyl group in a common molecule with a heat-curable silicone resin forms a coating having both good mar resistance and durable antifouling property despite a single coat.

Examples 12-19 and Comparative Examples 5-8

As in Example 7, coating liquids of varying formulation were examined. That is, coating liquids were prepared by blending 100 parts of the hardcoat liquid (A to D) with 1.0 part of the inventive coating liquid (#1 to #10). They were applied and cured to various substrates. The coated articles were tested. The results are shown in Tables 4 and 5.

TABLE 3

| | | Example | | | | | Comparative Example |
|---|---|---|---|---|---|---|---|
| | | 7 | 8 | 9 | 10 | 11 | 4 |
| Substrate | | Acrylic | Acrylic | Acrylic | PC | PET | Acrylic |
| Formulation (pbw) | Hardcoat liquid (A) | 100 | 100 | 100 | 100 | 100 | 100 |
| | Inventive coating liquid #1 | 0.3 | 1.0 | 5.0 | 0.3 | 0.3 | 0 |
| | Coat appearance | ○ | ○ | ○ | ○ | ○ | ○ |
| Antifouling to marker ink | Initial | ○ | ○ | ○ | ○ | ○ | X |
| | Durability (after toluene rub) | ○ | ○ | ○ | ○ | ○ | X |
| Mar resistance | Test 1 | ○ | ○ | ○ | ○ | ○ | ○ |

TABLE 4

| | Example | | | | | | | |
|---|---|---|---|---|---|---|---|---|
| | 12 | 13 | 14 | 15 | 16 | 17 | 18 | 19 |
| Substrate | Acrylic | Acrylic | Acrylic | Acrylic | Acrylic | Acrylic | Acrylic | Acrylic |
| Hardcoat liquid | B | C | D | A | A | A | A | A |
| Coating liquid | #1 | #1 | #1 | #2 | #3 | #4 | #5 | #6 |
| Coat appearance | ○ | ○ | ○ | ○ | ○ | ○ | ○ | ○ |
| Antifouling (to marker ink) Initial | ○ | ○ | ○ | ○ | ○ | ○ | ○ | ○ |
| Antifouling (to marker ink) Durability (after toluene rub) | ○ | ○ | ○ | ○ | ○ | ○ | ○ | ○ |
| Mar resistance Test 1 | ○ | ○ | ○ | ○ | ○ | ○ | ○ | ○ |

TABLE 5

| | Comparative Example | | | |
|---|---|---|---|---|
| | 5 | 6 | 7 | 8 |
| Substrate | Acrylic | Acrylic | Acrylic | Acrylic |
| Hardcoat liquid | A | A | A | A |
| Coating liquid | #7 | #8 | #9 | #10 |
| Coat appearance | crawling | crawling | crawling | crawling |
| Antifouling (to marker ink) Initial | ○ | ○ | ○ | ○ |
| Antifouling (to marker ink) Durability (after toluene rub) | X | X | X | X |
| Mar resistance Test 1 | ○ | ○ | ○ | ○ |

The data of Table 5 show that the addition of conventional well-known materials fails to provide durable antifouling property.

Comparative Examples 9-12

The hardcoat liquid (A) was coated and cured to a substrate to form a cured coat of 3 μm thick, and each of coating liquids #7 to #10 was coated and cured thereto to form a cured coat of 0.1 μm thick. The properties of these two-layer coats were examined.

TABLE 6

| | Comparative Example | | | |
|---|---|---|---|---|
| | 9 | 10 | 11 | 12 |
| Substrate | Acrylic | Acrylic | Acrylic | Acrylic |
| Coating liquid | #7 | #8 | #9 | #10 |
| Coat appearance | ○ | ○ | crawling | crawling |
| Antifouling (to marker ink) Initial | ○ | ○ | ○ | ○ |
| Antifouling (to marker ink) Durability (after toluene rub) | X | X | X | X |
| Mar resistance Test 1 | ○ | ○ | ○ | ○ |

The data of Table 6 show that conventional well-known materials fail to provide durable antifouling property even when they are applied as a two-layer coat.

Examples 20-25

These examples illustrate antireflective coating compositions. The hardcoat liquid (B) was coated on a substrate to form a high refractive index layer having a predetermined thickness. Then a low refractive index layer-forming coating liquid of the formulation shown in Table 7 was coated and cured thereto. This coating liquid was prepared by blending 100 parts of hardcoat liquid (C) with 2.0 parts of coating liquid (#1 to #6).

TABLE 7

| | | Example | | | | | |
|---|---|---|---|---|---|---|---|
| | | 20 | 21 | 22 | 23 | 24 | 25 |
| Substrate | | Acrylic | Acrylic | Acrylic | Acrylic | Acrylic | Acrylic |
| Hardcoat liquid | | C | C | C | C | C | C |
| Coating liquid | | #1 | #2 | #3 | #4 | #5 | #6 |
| Coat appearance | | ○ | ○ | ○ | ○ | ○ | ○ |
| Antifouling to marker ink | Initial | ○ | ○ | ○ | ○ | ○ | ○ |
| Antifouling to marker ink | Durability (after toluene rub) | ○ | ○ | ○ | ○ | ○ | ○ |
| Antireflection | Reflectance @ 550 nm (%) | 0.2 | 0.2 | 0.2 | 0.2 | 0.2 | 0.2 |

Japanese Patent Application Nos. 2004-113382 and 2004-113407 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An antifouling coating composition, comprising:
   (A) an organosilicon compound of formula (I):

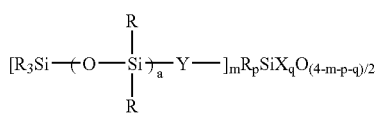
(I)

wherein R each independently is a $C_1$-$C_6$ alkyl group or phenyl group, X is a hydroxyl group, a halogen atom, a $C_1$-$C_6$ alkoxy, acyloxy or alkenoxy group, or a —NCO group, Y is a $C_2$-$C_{10}$ alkylene group, an arylene group or a combination thereof, "a" is an integer of 1 to 100, m, p and q are numbers satisfying $0.01 \leq m < 1$, $0 \leq p < 1$, $0.5 \leq q < 3$, and $0.51 \leq m+p+q < 4$.

2. An antifouling coating composition, comprising:
   (A) an organosilicon compound of formula (I):

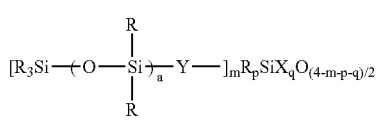
(I)

wherein R each independently is a $C_1$-$C_6$ alkyl group or phenyl group, X is a hydroxyl group, a halogen atom, a $C_1$-$C_6$ alkoxy, acyloxy or alkenoxy group, or a —NCO group, Y is a $C_2$-$C_{10}$ alkylene group, an arylene group or a combination thereof, "a" is an integer of 1 to 100, m, p and q are numbers satisfying $0.0 \leq m < 1$, $0 \leq p < 1$, $0.5 \leq q < 3$, and $0.51 \leq m+p+q < 4$; and
   (B) a heat-curable compound, wherein the weight ratio A/B ranges from 0.01/100 to 50/100.

3. The antifouling coating composition of claim 1, wherein the organosilicon compound of formula (I) is obtained through (partial) co-hydrolytic condensation of (a) an organosilicon compound of formula (II and/or a (partial) hydrolyzate thereof and (b) an organosilicon compound of formula (III) and/or a (partial) hydrolyzate thereof in a molar ratio (a)/(b) of 1/99 to 99/1:

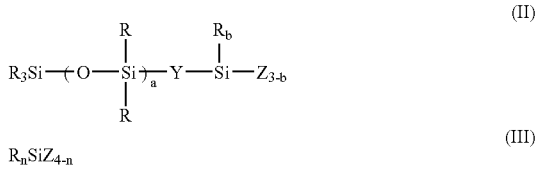
(II)

(III)

wherein R and "a" are as defined above, Y is a $C_2$-$C_{10}$ alkylene group, an arylene group or a combination thereof, Z is a halogen atom, a $C_1$-$C_6$ alkoxy or alkenoxy group, or a —NCO group, b is 0, 1 or 2, and n is 0, 1 or 2.

4. The antifouling coating composition of claim 3, wherein the organosilicon compound of formula (I) is prepared by a process comprising the steps of:
   (i) hydrolyzing an organosilicon compound of formula (II),
   (ii) adding thereto an organosilicon compound of formula (III) and/or a (partial) hydrolyzate thereof, and
   (iii) effecting (partial) hydrolytic condensation of the resulting mixture.

5. The antifouling coating composition of claim 1, wherein the organosilicon compound of formula (I) comprises diorganosiloxy units (—O—$SiR_2$—) with a degree of polymerization, represented by "a," of 1 to 50.

6. The antifouling coating composition of claim 2, wherein the organosilicon compound of formula (I) is obtained through (partial) co-hydrolytic condensation of (a) an organosilicon compound of formula (II) and/or a (partial) hydrolyzate thereof and (b) an organosilicon compound of formula (III) and/or a (partial) hydrolyzate thereof in a molar ratio (a)/(b) of 1/99 to 99/1:

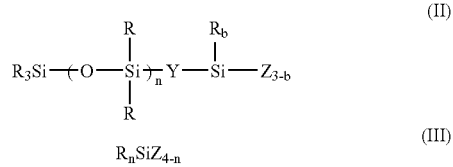
(II)

(III)

wherein R and "a" are as defined above, Y is —O—, a $C_2$-$C_{10}$ alkylene group, an arylene group or a combination thereof, Z is a halogen atom, a $C_1$-$C_6$ alkoxy, acyloxy or alkenoxy group, or a —NCO group, b is 0, 1 or 2, and n is 0, 1 or 2.

7. The antifouling coating composition of claim 6, wherein the organosilicon compound of formula (I) is prepared by a process comprising the steps of:
   (i) hydrolyzing an organosilicon compound of formula (II),
   (ii) adding thereto an organosilicon compound of formula (III) and/or a (partial) hydrolyzate thereof, and
   (iii) effecting (partial) hydrolytic condensation of the resulting mixture.

8. The antifouling coating composition of claim 2, wherein the organosilicon compound of formula (I) comprises diorganosiloxy units (—O—$SiR_2$—) with a degree of polymerization, represented by "a," of 1 to 50.

9. The antifouling coating composition of claim 2, wherein the heat-curable compound (B) comprises an organosilicon compound of formula (IV):

$R'_n SiZ_{4-n}$ (III)

wherein R' is a substituted or unsubstituted $C_1$-$C_6$ alkyl group or phenyl group, Z is a halogen atom, a $C_1$-$C_6$ alkoxy, acyloxy or alkenoxy group or a —NCO group, n is 0, 1 or 2, and R' may be the same or different when n is 2 and/or a (partial) hydrolytic condensate thereof.

10. The antifouling coating composition of claim 2, wherein the heat-curable compound (B) comprises a disilane compound of formula (V):

$Z_c R_{3-c} Si-A-SiR_{3-c} Z_c$ (V)

wherein R is as defined above, Z is a halogen atom, a $C_1$-$C_6$ alkoxy, acyloxy or alkenoxy group or a —NCO group, A is a divalent fluorine-containing organic group, c is 1, 2 or 3 and/or a (partial) hydrolytic condensate thereof.

11. The antifouling coating composition of claim 2, wherein the composition further comprises a component (C) of fine particles in an amount of 0.1 to 100% by weight, based on the total weight of components (A) and (B), that are selected from the group consisting of fine particles of silicon oxide, titanium oxide, aluminum oxide, tin oxide, zirconium oxide, antimony oxide, indium oxide, cerium oxide and iron oxide, fine particles of compound oxides thereof, and microballoons thereof.

12. The antifouling coating composition of claim 2, which further comprises 0.1 to 100% by weight of a component (D), based on the total weight of components (A) and (B), of a vinyl polymer containing alkoxysilyl groups.

13. The antifouling coating composition of claim 12, wherein the vinyl polymer (D) results from copolymerization of a vinyl monomer containing a UV-absorptive group.

14. The antifouling coating composition of claim 2, further comprising a condensation catalyst for silicone resins.

15. The antifouling coating composition of claim 2, further comprising an organic solvent.

16. A coated article comprising a substrate and a cured coat of the antifouling coating composition of claim 2 formed directly thereon or via another layer, said cured coat serving as an antifouling protective film.

17. The coated article of claim 16, wherein the other layer is a metal oxide layer or a layer of a resin containing Si—X groups, wherein X is a hydroxyl group, a halogen atom, a $C_1$-$C_6$ alkoxy, acyloxy or alkenoxy group, or a —NCO group.

18. The coated article of claim 17, wherein the proportion of component (A), relative to other components in the antifouling composition, present at the outermost surface of the cured coat is greater than the proportion of component (A) relative to other components in the antifouling composition.

19. The coated article of claim 16, wherein the substrate is plastic, metal, glass or ceramic.

20. The coated article of claim 16, which is a transparent article for use as an optical part.

* * * * *

UNITED STATES PATENT AND TRADEMARK OFFICE
CERTIFICATE OF CORRECTION

PATENT NO.        : 7,351,477 B2                                         Page 1 of 1
APPLICATION NO. : 11/098663
DATED             : April 1, 2008
INVENTOR(S)       : Yamaya et al.

It is certified that error appears in the above-identified patent and that said Letters Patent is hereby corrected as shown below:

Title page, add the below text to the (*) Notice as follows:

--This patent is subject to a terminal disclaimer.--

Signed and Sealed this

Tenth Day of March, 2009

JOHN DOLL
*Acting Director of the United States Patent and Trademark Office*